UNITED STATES PATENT OFFICE.

JOSEPH VAN RUYMBEKE, OF CHICAGO, ILLINOIS, ASSIGNOR TO THE NATIONAL CHEMICAL AND FERTILIZER COMPANY, OF SAME PLACE.

PROCESS OF MAKING FERTILIZER FROM STICK.

SPECIFICATION forming part of Letters Patent No. 461,164, dated October 13, 1891.

Application filed January 26, 1891. Serial No. 379,144. (No specimens.)

*To all whom it may concern:*

Be it known that I, JOSEPH VAN RUYM-BEKE, a subject of the King of Belgium, and residing at Chicago, in the county of Cook and State of Illinois, have invented a certain new and useful Improvement in Processes of Making Fertilizer from Stick, which is fully set forth in the following specification.

My invention relates to the treatment of the substance generally known as "stick" for the purpose of rendering the stick available for use as a fertilizing material in the compounding of fertilizers. This substance, (stick,) as is now well known, is produced by concentrating tank-water, which results from the rendering of meats, fatty substances, fish, &c. Stick is viscous and deliquescent, and, therefore, in its normal state, is unsuitable for use in the compounding of fertilizers. Heretofore in the utilization of this substance for fertilizing purposes it has been customary to treat the stick either by heat or chemical process and heat, whereby a dry and granulated material is obtained, which is suitable for use as an ingredient in the compounding of complete fertilizers.

It is the object of my present invention to avoid the necessity of drying and granulating the stick after it has been mixed with chemicals which are adapted to destroy its viscidity and deliquescence; and the invention consists in treating stick with sulphates, then dissolving in sulphuric acid, and then adding thereto tribasic phosphate of lime, as I will now proceed to describe.

In carrying out my process stick is obtained by evaporating tank-water, preferably while hot from the tank, to about thirty per cent. of moisture. The product is viscous and deliquescent, and is now generally known as "stick." This stick I then treat with chemicals which are adapted to cure the viscidity and deliquescence of the substance. A good chemical for this purpose, and one which I prefer, is a basic persulphate of iron, and when this is employed the proportions should be about three hundred and thirty pounds of the persulphate to one ton of thirty per cent. stick. The persulphate of iron should be in a dry condition and should be thoroughly mixed with the stick. Being thus added in a dry condition the persulphate takes up a portion of the moisture, and will reduce the moisture of the entire mass to about twenty per cent. The next step is to dissolve this mass in sulphuric acid, and to facilitate this operation the material is preferably ground or pulverized by any suitable means, and sulphuric acid is then mixed therewith until it is dissolved. For this purpose I prefer to use acid of about 50° Baumé. There is then added to this liquid mixture tribasic phosphate of lime in a pulverized condition and in sufficient quantity to form a pasty mass. The phosphate is thoroughly mixed with the liquid and the pasty mass resulting from this treatment is then piled up and left in heaps for a considerable time. In this condition the mass will generate considerable heat, and in a few hours will solidify by chemical action, and if this mass is left undisturbed for several weeks it will continue to dry apparently; but in reality there is no loss of moisture, the water contained being taken up by the crystallization of the gypsum produced in the reaction of the sulphuric acid on the lime contained in the phosphate. After lying in piles for this length of time the process of crystallization will be completed and the material composing the mass will then be brittle and dry in appearance and to the touch, and is suitable for use, either ground or otherwise, in the ordinary manufacture of complete fertilizers.

In practicing this process I preferably use for the compound from eight hundred pounds to one thousand pounds of stick treated with sulphates at about twenty per cent. of moisture and fifteen hundred pounds of sulphuric acid of the strength specified above. After the stick and acid have been thoroughly mixed together I add to this quantity about two thousand pounds of tribasic phosphate of lime, and manipulate as described above. I prefer a phosphate analyzing about thirty per cent. of phosphoric acid and tolerably free from limestone or magnesia, and for this reason "Carolina rock" is very suitable for this purpose, as the conditions mentioned are usually found in this phosphate.

By this process I obtain a merchantable material without the somewhat difficult and expensive treatment with heat, which has been heretofore generally used in the treatment of stick for fertilizing purposes. It will be noticed that in carrying out my process there is nothing but successive mixtures at ordinary temperature. The process is therefore exceedingly simple and cheap.

Having thus described my invention, what I claim as new, and desire to secure by Letters Patent, is—

The herein-described process of treating stick for making fertilizing material, consisting in first treating the stick with sulphates in any usual way, then dissolving the stick thus treated in sulphuric acid, and then mixing therewith tribasic phosphate of lime and allowing the mass to lie until apparently dry, substantially as described.

JOSEPH VAN RUYMBEKE.

Witnesses:
CARRIE FEIGEL,
A. M. BEST.